Oct. 6, 1970     P. C. F. WOLFENDALE     3,532,972
DETECTOR APPARATUS INCLUDING DIGITALLY OPERABLE
BRIDGE REBALANCING MEANS
Filed Aug. 17, 1967     8 Sheets-Sheet 5

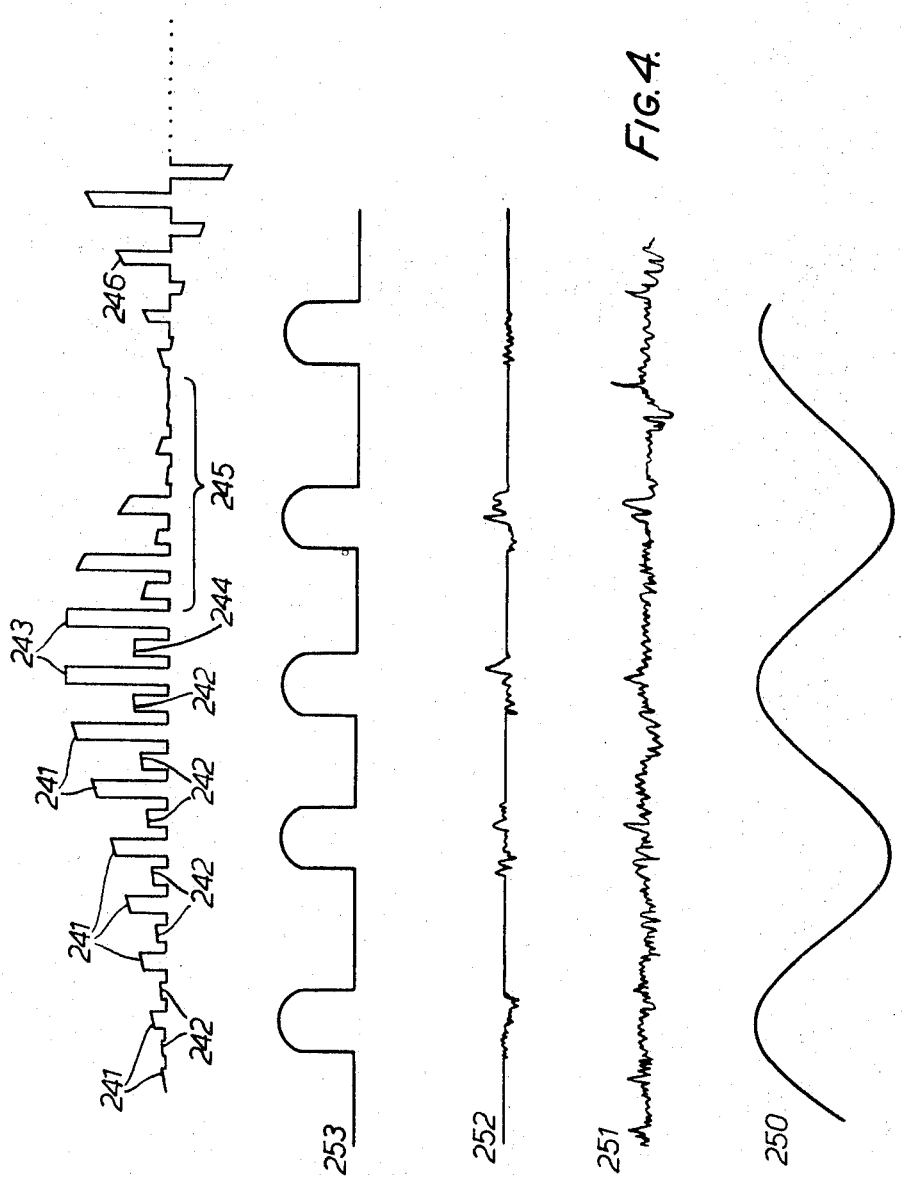

Peter C. F. Wolfendale
INVENTOR

BY Lawrence E. Laubscher
ATTORNEY

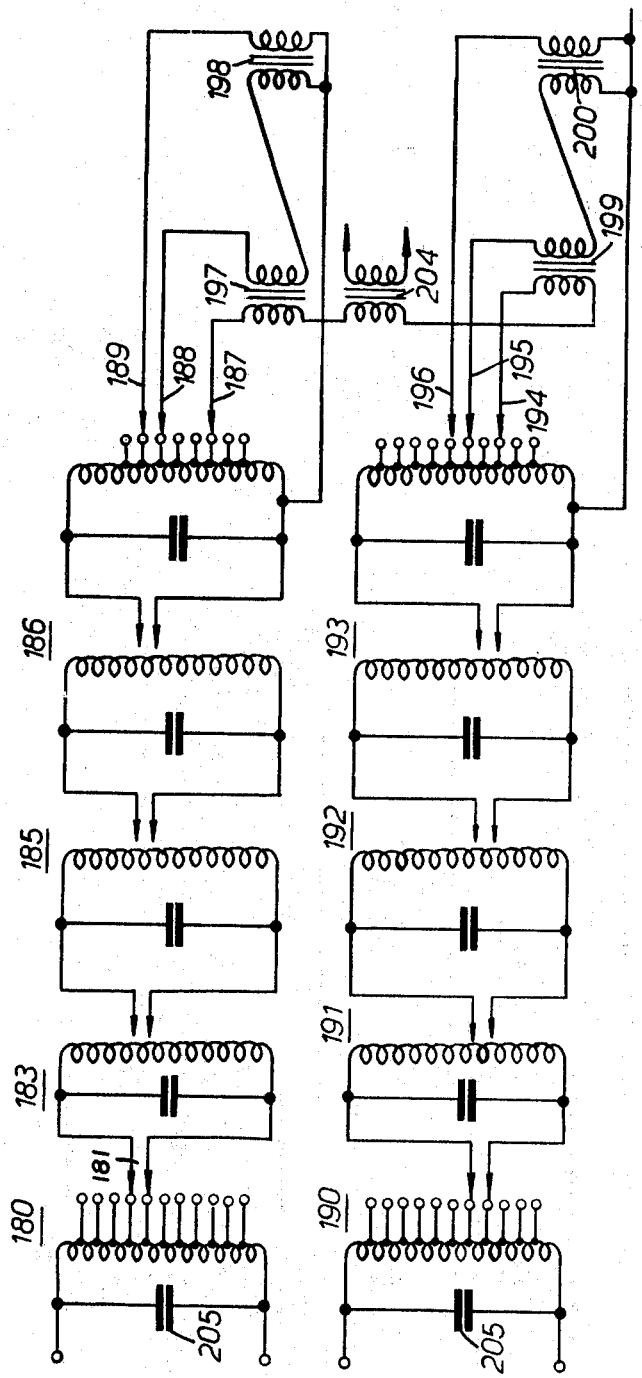
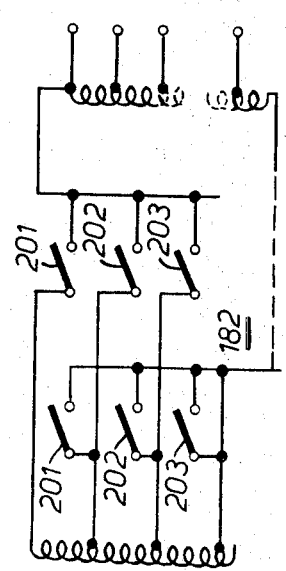
FIG. 6a.
FIG. 6b

United States Patent Office 3,532,972
Patented Oct. 6, 1970

3,532,972
DETECTOR APPARATUS INCLUDING DIGITALLY OPERABLE BRIDGE REBALANCING MEANS
Peter Caleb Frederick Wolfendale, Chiltern Close, Great Brickhill, Bletchley, Buckinghamshire, England
Filed Aug. 17, 1967, Ser. No. 661,456
Claims priority, application Great Britain, June 21, 1967, 28,716/67
Int. Cl. G01r 17/06, 27/00
U.S. Cl. 324—57                                9 Claims

ABSTRACT OF THE DISCLOSURE

A detector is disclosed in which the input signal is integrated over well defined periods, the output of the integrator being sampled at the end of each integration period, and the integrator being discharged between each integration period. The operation of the integrator may be interrupted during the integration periods to improve the signal to noise ratio, the interruptions being synchronized with the input signal if this is A.C. The integration period may be chosen to eliminate a particular interfering frequency such as line freqency. The detector can be used in automatically balancing A.C. bridges, and other apparatus in which a controlled element is controlled by a means responsive to the detector output; the responsive means may respond in steps at each integration period, and the nature of the steps may be made a function of the detector output.

---

This invention relates to detection apparatus. The detection apparatus may be suitable for use in automatically balancing A.C. bridges and other apparatus generally of the servo type and the invention includes such use.

The invention provides detection apparatus comprising integrating means for integrating an input signal over a plurality of integration periods, sampling means responsive to the output of said integrating means at the ends of said integration periods to generate an output signal, and control means for actuating said integrating means at the beginnings of said integration periods and for reducing signals accumulated in said integrating means after the ends of said integration periods, whereby the effect of integration during one integration period is substantially reduced during a subsequent integration period.

Figure 1:
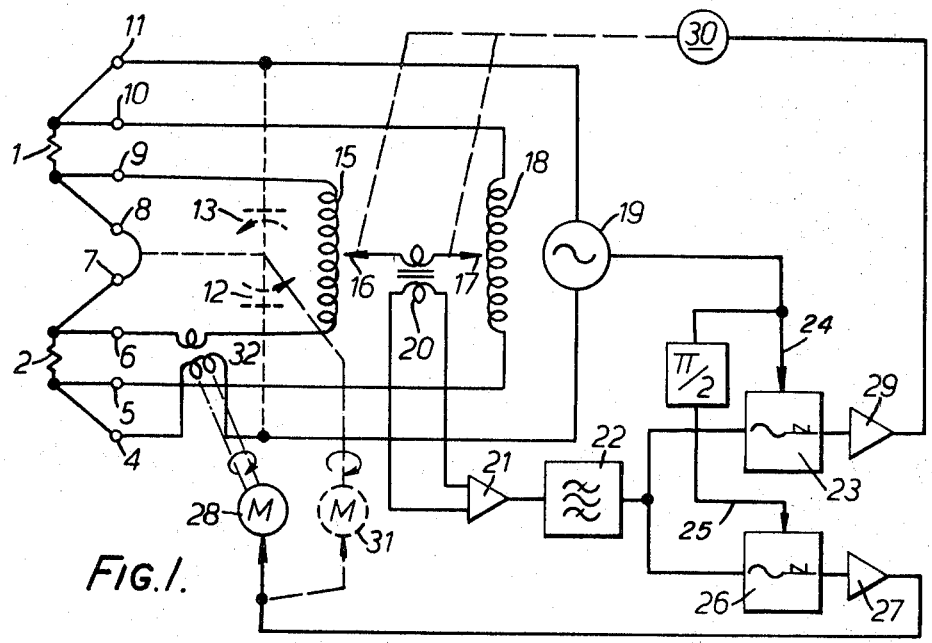
Figure 3A:
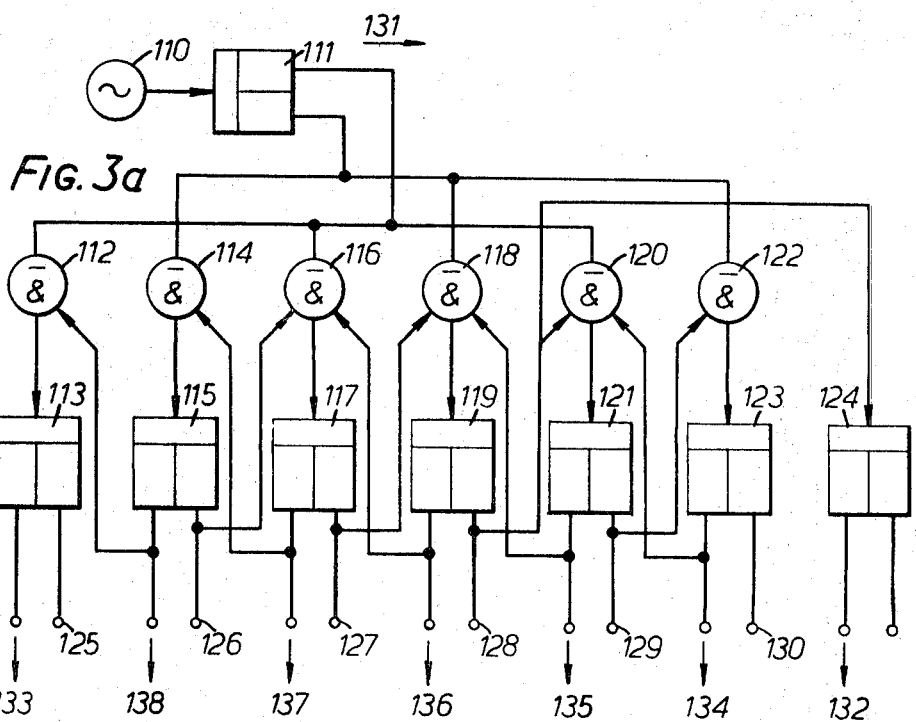
Figure 2:
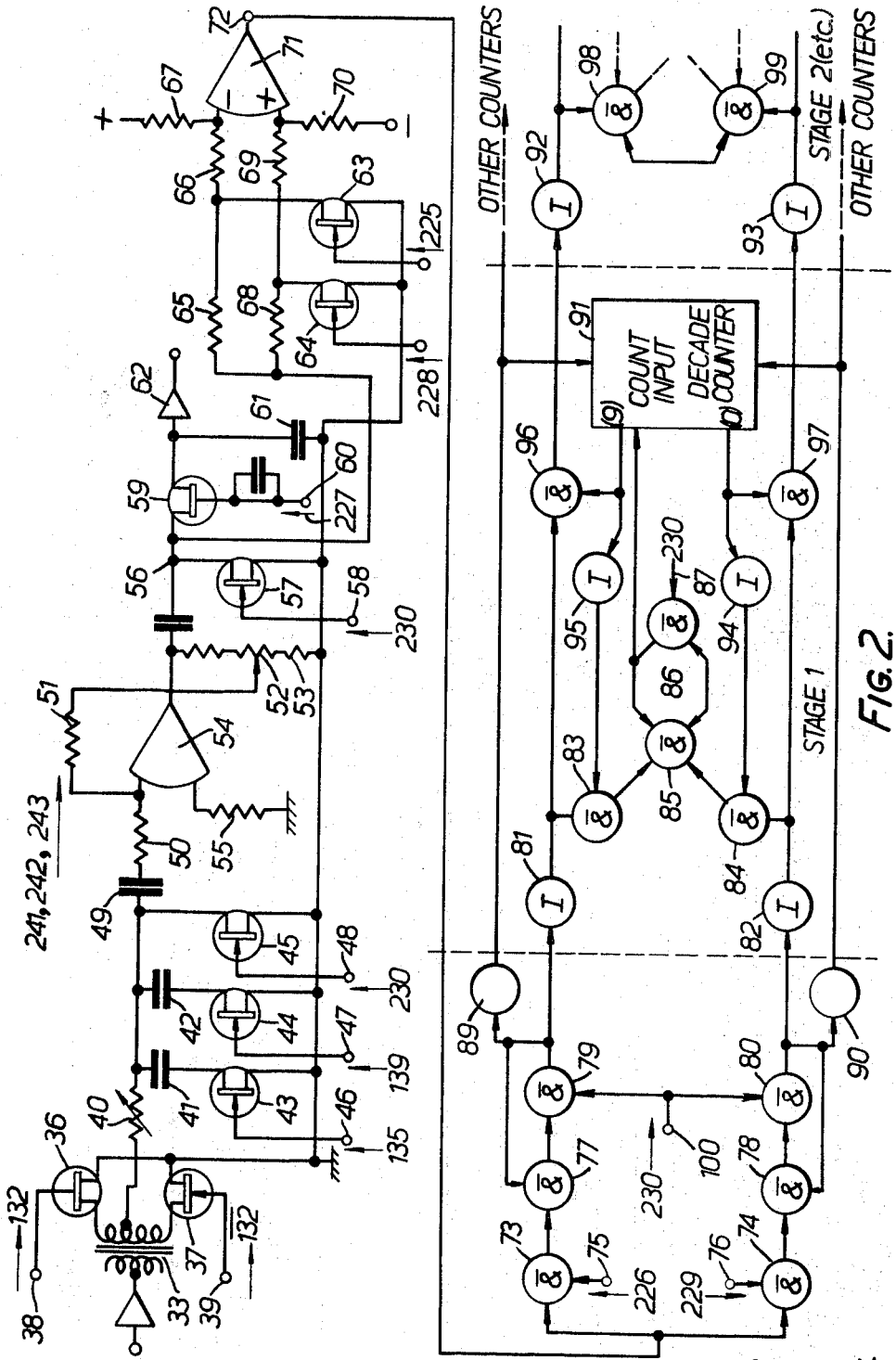
Figure 3B:
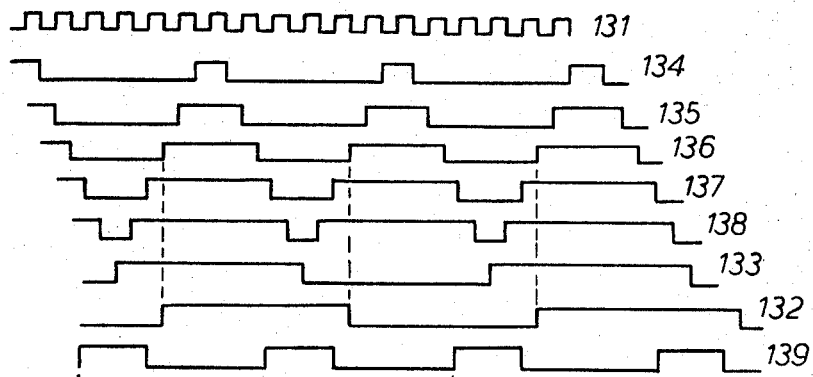
Figure 5B:
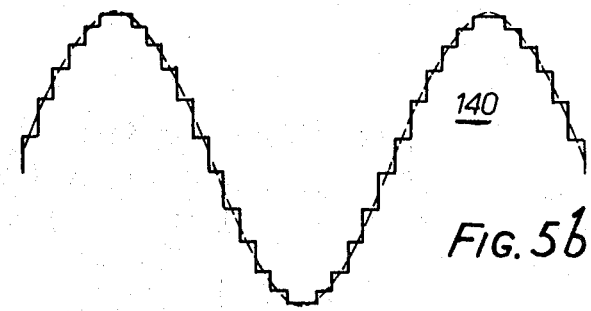
Figure 5D:
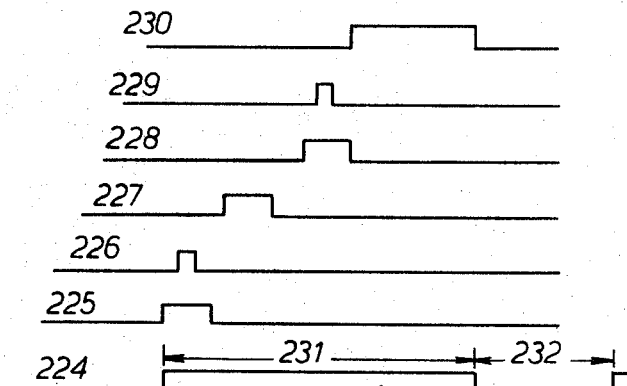
Figures 5A, 5C:
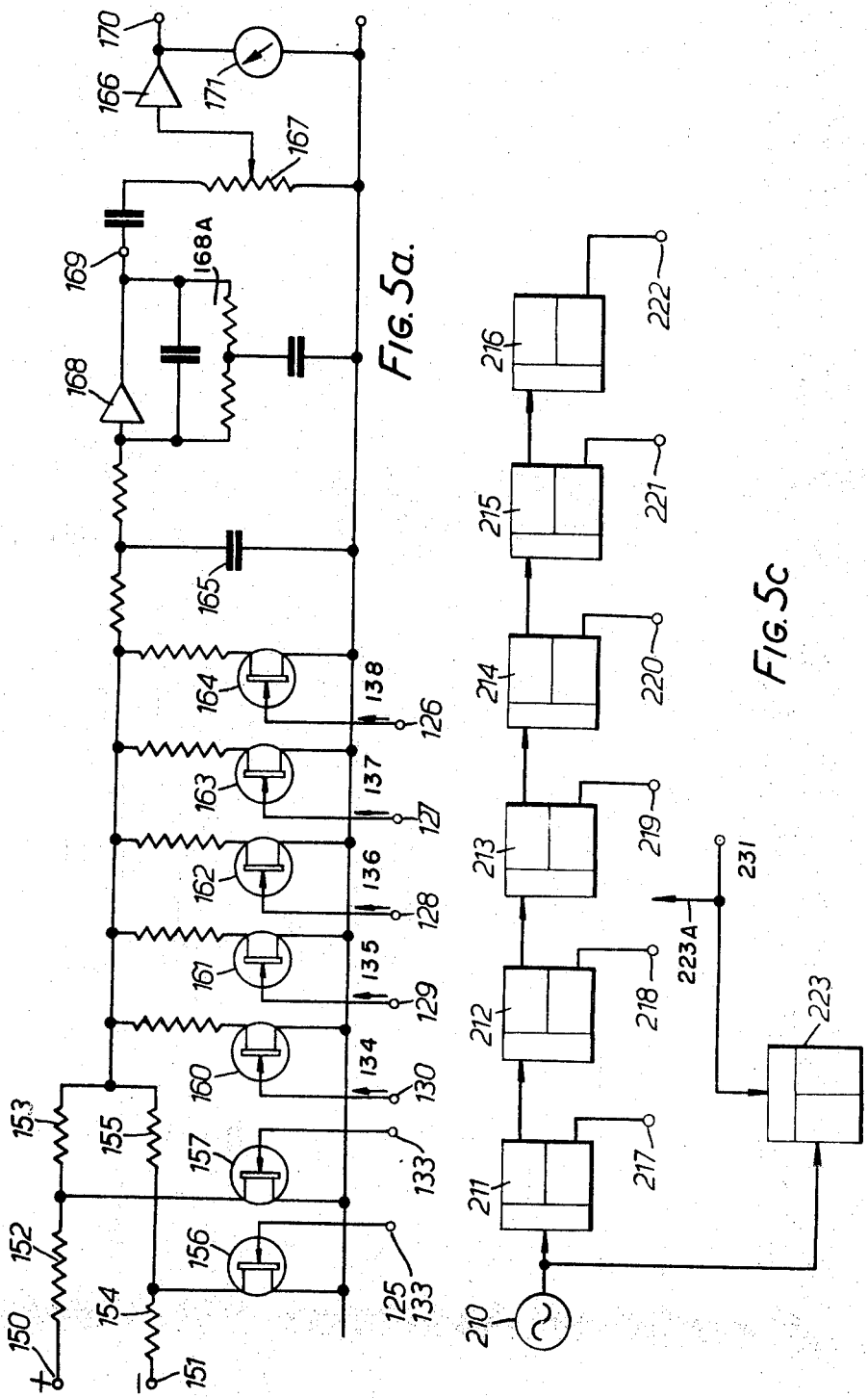
Figures 7, 8:
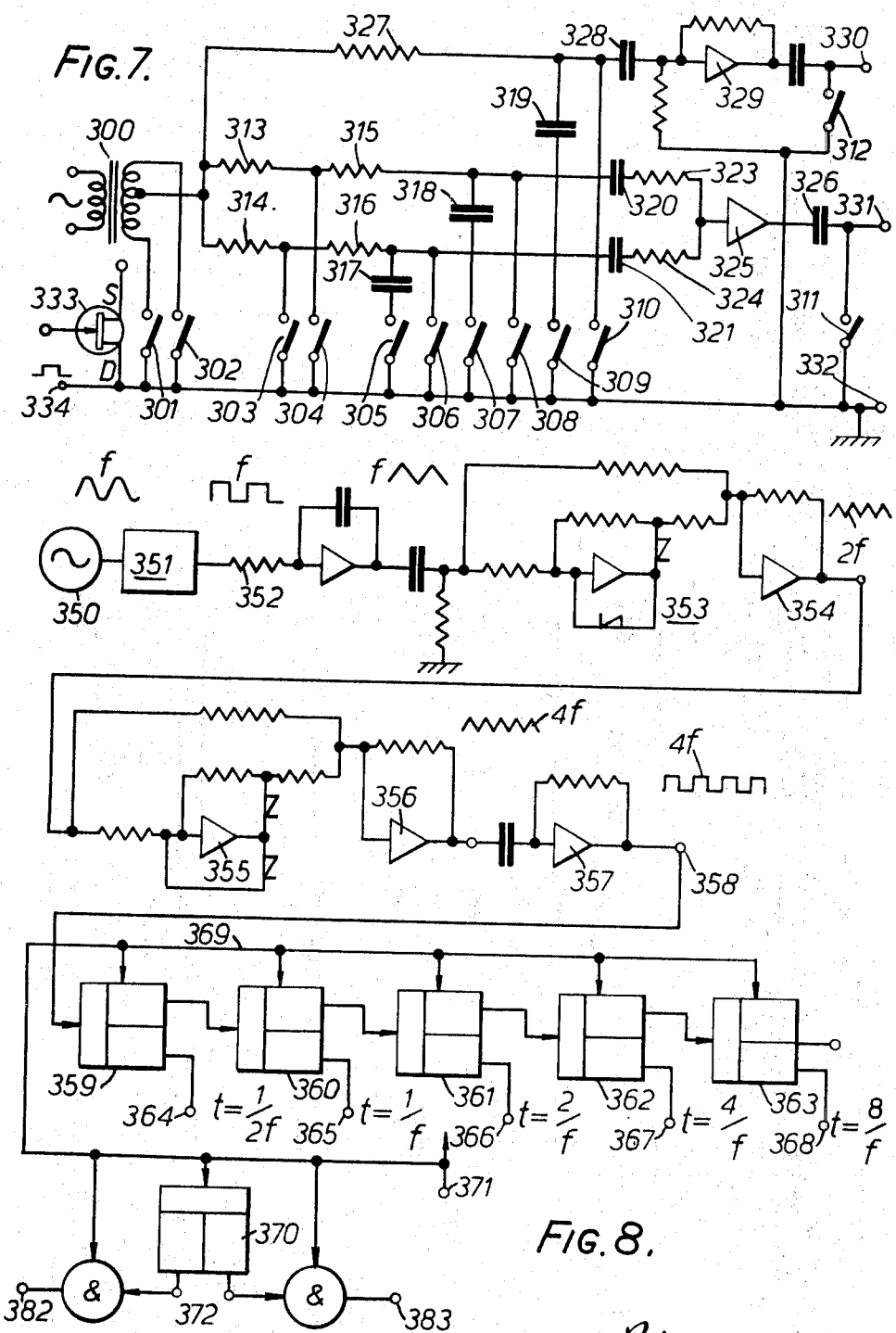
Figure 9:
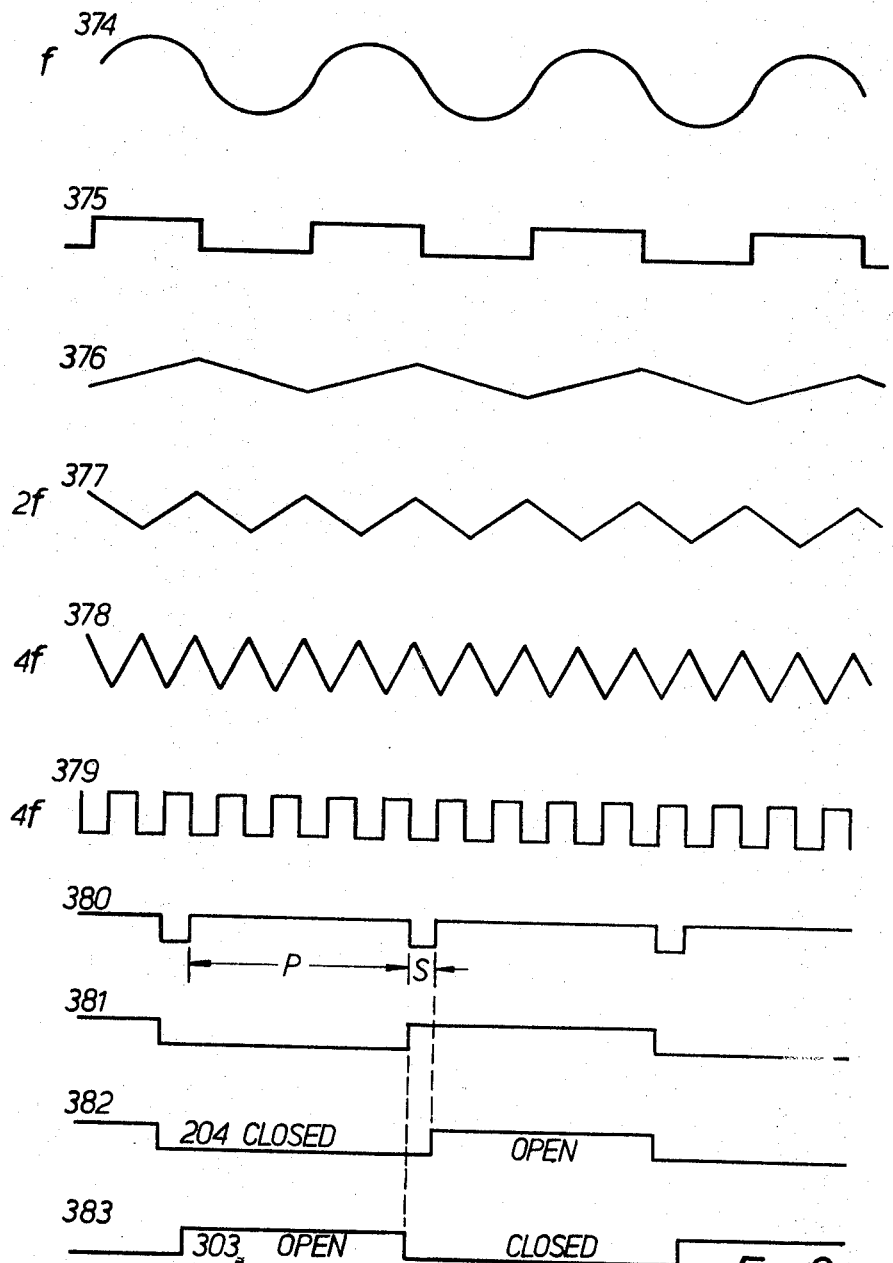

Other features and advantages of the invention will appear from the following description of embodiments thereof, given by way of example with reference to the accompanying drawings, in which:

FIG 1 is a schematic diagram of an automatically balancing A.C. bridge,

FIG. 2 is a schematic diagram of a detector in accordance with the invention which is used in an A.C. bridge of the kind shown in FIG. 1, FIG. 3a is a schematic diagram of a signal generator forming part of the detector, and FIG. 3b, is a diagram of various waveforms produced by the signal generator, FIG. 4 is a diagram of various waveforms appearing in the detector, FIG. 5a is a schematic diagram of a sine-wave synthesizer, FIG. 5b is a diagram of the output of the synthesizer, FIG. 5c is a schematic diagram of a further signal generator in the detector, and FIG. 5d, is a diagram of waveforms produced by the further signal generator, FIG. 6a is a schematic diagram of the standard arms of the bridge, and FIG. 6b is a detail of the tap-changing arrangement, FIG. 7 is a schematic diagram of an alternative detector, FIG. 8 comprises a schematic diagram of a signal generator for the detector of FIG. 7, and FIG. 9 which is a diagram of the waveforms produced in the apparatus of FIG. 8.

FIG 1 shows a schematic diagram of an automatically balancing A.C. bridge which is used to determine the ratio of two resistive elements 1 and 2. These elements may be resistance thermometers as in platinum or germanium thermometry, or strain gauges or they may be inductors or capacitors, or in general any pair of impedances whose ratio it is desired to know. In the case shown the resistance elements 1 and 2 are each connected by four leads to the bridge itself. These leads are terminated at points 4, 5, 6, 7, 8, 9, 10 and 11. The form of the bridge is the well-known double ratio bridge, and this detector is illustrated as applied to this bridge, by way of example only. Elements 15 and 18 are potential dividers which may be in the form of auto-transformers and the taps 16 and 17 on these are connected to a transformer 20. The transformer 20 is connected to the input of an amplifier 21 for amplifying the out-of-balance signal. The carrier supply to the bridge comes from a generator 19 and is applied to the resistance elements 1 and 2 via terminals 4 and 11. If the inductive potentiometers 15 and 18 are identical and the taps 16 and 17 normally move in exact synchronism, it may be shown that there will be zero output from the transformer 20 when the ratio of the two resistive elements is the same as the ratio of the taps on the inductive dividers 15 and 18. The output of amplifier 21 is filtered to remove unwanted noise by filter 22 and the output applied to two phase sensitive detectors 23 and 26. These are switched synchronously by a signal from 19 via leads 24 and 25. The phase of carrier supply 26 is shifted by 90° so that one detector responds to the in-phase component and the other to the quadrature component of the error signal at the output of filter 22. The inphase component from 23 is amplified by amplifier 29 and applied to a tap changing device 30 which is arranged to drive the taps 16 and 17 in the appropriate direction to restore balance in the bridge circuit in the same manner as servo, and also operate an indicator (not shown) if desired. The quadrature output of 26 drives an amplifier 27 and operates a motor which restores balance to the quadrature component of the two elements. This is done either by means of a differential condenser 12 and 13 or an inductometer 32. These are driven by motors 28 or 31 respectively. This again behaves in the same manner as a servo so that there are two servos operating on the error signal at once, one to reduce in-phase the other to reduce the quadrature, so that the total output signal is zero when balance is achieved. In this case the value of the quadrature signal is not of interest, and it is only necessary to balance it to zero in order that it shall not interfere with the in-phase signal balance by blocking the amplifier or producing a spurious reading.

FIG. 2 shows a preferred detector circuit. In this an input transformer 33 is connected to the output of the amplifier 21 of FIG. 1. The transformer 33 has a centre tapped secondary connected to 2 semi-conductor switches 36 and 37 such as field effect transistors. These can be switched on alternately by signals applied to terminals 38 and 39 so that either one side or the other of the transformer is connected to a ground potential. The wave forms which do this are form 132 in FIG. 3b and its inversion 132. The centre tap is connected via a resistance 40 to the two condensers 41 and 42, which can be charged when switches 43 and 44 in series with the condensers are switched on by potentials applied to terminals 46 and 47. Switching wave-forms would be 135, and 139 which is the inversion of 137 in FIG. 3b so that each switch samples the cyclic input signals for spaced periods of time less than the duration of a signal cycle and predeterminedly related thereto. The two condensors integrate the input signal over a period of time, condenser 41 collecting the in-phase component and condenser 42 collecting the quadrature component of the input signal. Switches 36 and 37 are synchronized with switches 43 and 44 so that the polarity applied to the two condensers is always in the right sense to increase the charge. A condenser 49 is also connected to the junction of condensers 41 and 42 and a switch 45 is connected between the common point and earth, and is fed by waveform 230 (FIG. 5) switches 43 and 44 are arranged so that the conduction period is a fraction of the cycle of the carrier being detected. The intervening period is used to short the common point to earth via switch 45. The signal from the integrators is passed to an amplifier 54 which has a pulsating voltage to amplify. The amplified signal at 56 is filtered and chopped by a switch 57 synchronized with switch 45 so that a D.C. value equivalent to the charge on capacitor 49 appears at point 56 suitably amplified. The amplifier thus gets rather like a chopper amplifier but switch 45 also has other purposes. If the detector circuit had been intended for use with a D.C. input signal switch 57 would no longer be required and the signal on the condensers 41 and 42 could have been amplified complete with the D.C. component to appear at what is now represented by point 56.

The wave-forms generated by this operation are shown in FIG. 4. Pulses 241 represent the accumulated signal on condenser 41, which is assumed to be gradually increasing each time it is connected to the amplifier by switches 36 and 37, and the pulses 242 represent the charge on condenser 42 which is assumed also to increase but at a different rate. The charge on condensers 41 and 42 is allowed to accumulate for a period of time and then the switches 36 and 37 are both left open circuit for a short period as at pulses 243 and the voltage which appears at point 56 is sampled by two amplifier systems 71 and 62. 71 is concerned with the in-phase component, and 62 with the quadrature component. With 36 and 37 switched off, the charge on 41 and 42 remains at a comparatively static value with only a small amount of leakage. The value of this voltage is sampled by amplifier 71 by operating semi-conductor switches 63 and 64, which are operated by wave-forms 225 and 228 (FIG. 5d). These switches are normally closed and when one is opened this allows a signal to appear at the corresponding input of the differential amplifier 71. In the case of switch 63 when this opens a signal is applied via 65 and 66 to the input of 71 which is biased by a resistor 67 connected to the positive supply. Only if the signal applied to the input elements 65 and 68 is negative enough to overcome the positive bias then the output of the amplifier will be positive. Alternatively when a switch 64 is opened and 63 closed then only if the signal is sufficiently positive to overcome the negative bias applied to the positive input of amplifier 71 via element 70 will the output of the amplifier be positive. Under all other conditions, the amplifier output will be negative. There are thus two states possible for the output of the amplifier 71—either positive or negative—at the times when the switches 63 or 64 are operated. A positive signal exceeding the range determined by the bias potentials applied to the inputs of amplifier 71, indicates the presence of an error signal, a negative signal indicates the absence of an error signal. Whether the sense of the error signal is positive or negative is decided by logic circuits which compare the phase of the output of amplifier 71 with the carrier. After the voltage of the condensers has been sampled by amplifier 71 and its associate circuits then switch 45 is operated for a sufficiently long period to discharge condensers 41 and 42 so that the charging cycle may restart. In this manner the signal is integrated for a period of time and then the integrator is emptied so that there is no carry-over of signal into the next period of integration. In this way the band-width of the signal can be restricted without introducing a time constant into the circuit which would cause it to hunt or oscillate as is sometimes the case with servo systems with band pass filters. The period for which these condensers are charged may be varied so as to produce the effect of a variable band pass filter. A further advantage is that the period of time for which each condenser is charged during the carrier cycle may be restricted so as to improve the signal to noise ratio. In FIG. 4 if wave-forms 250 represents the carrier signal being detected and wave-form 251 represents spurious noise, it will be seen that if, for example, the in-phase condenser is charged every half-wave for a period of one-sixth of the cycle, the charging will occur during the time when the in-phase signal is most likely to be present. On the other hand the noise is equally likely to be present during the whole period so that an advantage has been gained by making maximum use of the signal compared with the noise. A further advantage of the restricted period of charging is that it may be made to discriminate against harmonics of the carrier signal, for instance if the charging period for each half cycle is exactly one-third of each half cycle then there will be zero output for second or even harmonics and for the third harmonics and multiple thereof. Another advantage of the variable integrator period is that the period may be made exactly equal to the period of some interfering frequency such as the 50 or 60 cycle mains or a multiple thereof so that the net integrated result is zero. If the amplifier which drives the transformer 33 is able to handle a certain level of signal there is an advantage in doing the detection at a level which is 500 or 1000 times below this. This means that a large amount of interference can be present without being modulated on the signal by non-linearities of the amplifier. Hence the amplifier system is said to have a dynamic ratio of 500 or 1000 to 1 and the detector system is able to discriminate against noise and interference of this sort of value and produce output at 56 for amplification by the remaining circuits with greatly reduced interference components; for example the integrating period may be set to several seconds whereas the carrier frequency may be 380 cycles which would allow integration over several thousand cycles of the carrier frequency.

In addition to the sampling of the in-phase signal by 71, the amplifier 62 has a switch 59 which is synchronized to switch 44 so that a capacitor 61 will receive a charge for application to the quadrature servo motor to enable it to operate separately in reducing the quadrature balance to zero.

It will be apparent that the integrator elements 40, 41 and 42 represent a rudimentary form of integrator. More sophisticated integrators may of course be used in practice. The logic circuits fed by amplifier 72 are straightforward. Nand gates 73 and 74 have inputs 75 and 76 which are fed by strobe pulses 226 and 229 in FIG. 5. These enable the output of amplifier 71 to be sampled to establish whether there is a positive or negative error signal present. From hereon the two halves of the circuit are symmetrical, the upper section of the logic circuit driving a digital register, of which one reversible counter stage is shown at 91, in a positive direction, while the lower section of the logic circuit drives the register in the negative direction. Thus the logic circuit acts as a count control means controlling the operation of the register. The counters control the tap-changing of the potential dividers 16 and 17 by reed relays. Nand gates 77 and 79 are connected together as a bistable circuit with a clear signal applied at point 100. The output of 79 is applied to a series of circuits which determine which counter shall be operated in the presence of an error signal and in which direction. Inverter 81 inverts the signal and applies it to Nand gates 83 and 96 simultaneously. If counter 91 is then set to a count of 9 gate 96 is able to pass on a signal to 92 in stage 2 and gate 83 is inhibited from giving an ouptut.

If however the counter 91 is not set at 9, then gate 83 can set the pair of Nand-gates 85 and 86 which form a bistable circuit. After this bistable circuit has been set, there is applied to 87 a reset and count pulse (230 in FIG. 5d) which restores the unset condition and applies a pulse to counter 91. The count to which counter 91 is set will then increase 1 unit in the direction of 9. The direction of count has been determined by an input from 89 to the counter which causes it to count in the appropriate direction. 91 is a reversible counter. Exactly the same action occurs in response to a negative signal in the chain of elements comprising Nand gate 74, bistable 78, 80, inverter 82, Nand gate 84, gate 90, inverters 93, 94 and Nand gate 97. If the counter 91 has reached 9 it cannot proceed any further and for this reason it inhibits the operation of 83 and enables 96 to have an output which passes onto 92. The same sequence of events is followed for the next counter stage and the fact that there is a chain of logic circuits in series ensures that only one counter will ever operate and that the count is passed on only when preceding counter has saturated to either 9 or 10.

The counter 91 is used to drive relays which in turn operate the inductive voltage dividers in FIG. 6. These inductive potentiometers are driven in a suitable sequence to restore balance to the bridge circuit, by means of the counters as previously described.

FIG. 3a and FIG. 5c show the means used for generating the carrier and switching signals. Since the switching elements 43 and 44 which are in series with condensers 41 and 42 have to be switched on at precise intervals during the carrier cycle it is necessary to synchronize the switching signals with the carrier. The way this is done to generate a square wave 131 in FIG. 3b with a generator 110 (FIG. 3a) and a bistable device 111. The output of bistable device 111 is applied to a series of bistable devices 113, 115, 117, 119, 121 and 123. These are arranged in such a manner that 113 generates wave-form 113, 115 generates wave-form 138, 117 generates wave-form 137, 119 generates wave-form 136, 121 generates wave-form 135, 123 generates wave-form 134, and 124 generates wave-form 132. It will be seen that bistable device 111 first sets 113 via gate 112. The next transition of 111 sets 115 via 114 and 115, in turn inhibits 112 passing further pulses to 113. At the next transition of bistable device 111, 115 now enables 116 to switch 117 via the next transition of 111 which in turn inhibits 115 from alternating by disenabling 114. 117 has now enabled 118 to pass a pulse 119 on the next transition of 111. This in turn enables 120 and so on until 123 is set. We have now climbed the staircase wave-form formed by 133, 138, 137 etc. to 134 and are ready to reverse the procedure. This is done because there is no inhibit on 122 as there is on the other gates and so on the next transition of 111, 123 now changes again and removes the inhibit from 120 and so on all the way down the chain until 113 finally reverses and the cycle starts again. In this way the series of wave-forms shown in FIG. 3b is generated with the exception of 132 and 139. 132 is obtained by bistable device 124 dividing wave-form 136 by 2 and produces a wave-form similar to 133 but displaced in-phase so that it can be used for driving switches 36 and 37 in FIG. 2. 139 is produced by inverting 137.

The swtch wave-form of FIG. 3b are applied to the sine wave synthesizer in FIG. 5a. In this the switches 160 to 164 inclusive are operated respectively by wave-forms 134 to 138. The associated resistors vary the attenuation of the voltage applied at points 150 and 151 before passing it on the filter network including capacitor 165 to an amplifier 168 which has a feedback network including a bridged-T notch filter 168A and thus provides gain preferentially at the appropriate frequency. Switches 156 and 157 are driven from wave-form 133 and the inversion of it in FIG. 3, and these serve to alternate the polarity of the signal applied to switches 160 to 164. If the associated resistances of these switches are in the right ratio the signal input to the filter will approximate to a sine wave with high harmonics superimposed. The filter filters-out these harmonics and leaves a sine wave 140 (FIG. 5b) which is firmly synchronized to the set of wave-forms shown in FIG. 3b and is fed out for use as the bridge carrier supply by way of a buffer amplifier 166, the input to which is adjusted by a potentiometer 167 to yield at output terminal 170 a voltage of a required value as measured by a meter 171. From these wave-forms may then be selected those with the necessary periods to operate the switches 36, 37, 43, 44, 45, 57, 59, 63, 64 and also the strobe signals applied to 75 and 76, in FIG. 2.

The other generator shown in FIG. 5c is for the integrating period. Here generator 210 sets the period and may for instance be synchronized with the mains, that is, with a period of say 0.02 second. This is divided down successively by a counter chain 211 to 216. A further bistable device 223 has its input driven from any of the outputs of this divider chain that is 217 to 222 and each time it is operated it is reset one period of the generator 210 later. The wave-forms 224 to 230 of FIG. 5d shows what is needed for the integrator. 224 shows the period 231 which represents one cycle of the generator 210. 225 is applied to switch 63 in FIG. 2 and is synchronized with the operation of switch 43 connected to condenser 41 so that the voltage of this condenser is sampled by amplifier 71. Wave-form 226 is the strobe applied to 75 in FIG. 2; wave-form 227 is the switching signal for switch 59 applied at point 60 in FIG. 2 to sample the quadrature error and is synchronized to the switch 44 operating condenser 42. Wave-form 228 is again synchronized to switch 43 with condenser 41 to sample the negative error signal and again wave-form 229 is the strobe at 76 applied to the other half of the logic chain in FIG. 2. Wave-form 230 is the remainder of the period 231 and is used to operate 45 so that successive switchings of switches 43 and 44 cause condensers 41 and 42 to be discharged through 45. Directly the pulse 231 comes to an end the next period 232 which is determined by the setting of the switch at the input to 223 commences and the new integrating period starts as described previously. Also in FIG. 5a is shown an amplifier 166 which acts as a buffer to provide the energizing signal for the bridge carrier supply.

FIG. 6 shows the inductive potential divider forming the standard arms of the bridge. 180, 183, 185, 186 and 184 are all auto transformers with 11 taps the first and last being the beginning and the end of the chain of windings. All the windings are identical so that the voltage across any adjacent pair of them is identical with that across any other adjacent pair. The switch 181 is a pair of wipers which can move up and down the chain of contacts in the familiar fashion to produce the necessary voltage to apply to the next transformer 183. FIG. 6b shows at 182 an arrangement of contacts in which pairs of ganged switches 201, 202, 203 etc., can be operated by the counter 91 to vary the effective tap on the potentiometer. The chain of potentiometers 190 to 193 and 185 is identical with the chain 180 to 186 and 184 and the switches are ganged together so that the two pairs of potentiometers operate simultaneously.

Transformers 197 and 198 are 10 to 1 ratio and are used in conjunction with taps 187, 188 and 189 to provide the least two significant figures of the 7 decade divider chain. Transformers 199 and 200, in conjunction with tappings 194, 195 and 196, have a function similar to that of transformers 197, 198. The output of the system is taken by way of a transformer 204. 199 and 200 have a similar function.

The two leads to each of the two transformers 180 and 190, which are the inputs to the two divider chains, are connected as in FIG. 1 to the impedances to be measured. The condensers 205 are intended to tune the inductive component of the individual auto-transformers so as to reduce the current drawn from the source in each case.

It will be appreciated that many modifications may be made. The switching of the balancing elements is here described as relays such as reed-relays, but could also be semiconductor switching elements. The counter is described as a reversible decade counter, but may be any convenient sub-division such as for example binary.

The detection system described may be achieved with other switching elements than the semiconductors shown, and with various types of semiconductor, and may also be applied to other conditions where detection of signals is concerned.

A variation of the detector circuit is shown in FIG. 7. In this, the A.C. signal of varying phase and amplitude is applied to transformer 300. Either side of the secondary winding of transformer 300 can be grounded through switches 301 or 302 which may be field effect transistors such as drawn at 333 with 334 as the switching signal. The remainder of the switches 303 to 312 may also be similar but not necessarily so. The function of this circuit is similar to that described in conjunction with FIG. 2, but in this case two condensers are provided to collect the in-phase signal, these are 317 and 318. Also switches 303 and 304 are added so that either 317 is charged, or 318 is charged, but not both at once. The advantage of this is while one condenser is charging, the other is discharging, and one can ensure that all charge drains away from the discharged condenser before its own re-charge cycle starts again. The sequence of events is: open 303, close 304, 308 and 309, condenser 318 now discharges, and condenser 317 charges due to being cyclically connected to transformer 300 by switches 301, 302 and 317. The charge on 317 builds up during the chosen integration period. When this is complete the charging process is stopped by closing 303, and a short period of time is allowed for condenser 317 to have its voltage sampled while free from input signal, and also for switching of the bridge circuit or other external circuit to take place and for the switching transients to die down. Now the cycle repeats but with the roles of 317 and 318 interchanged. 317 discharges and 318 charges in the same manner as just described for 317. Condenser 319 has its switch 309 synchronzied to the quadrature component of the signal and it is assumed here that it does not have the same need for complete discharge as the in-phase elements, although the same circuit could be used as for the in-phase, or vice-versa.

In order to generate the wave-forms and set the switching periods for FIG. 7, it may be necessary to generate a signal which is accurately locked in-phase and frequency with some other source of signal. For instance if the integrating period has to be equal to or a multiple of the mains frequency so as to discriminate against mains interference and the mains is 50 cycles per second, then the least period which can be generated is 0.02 second. This least period however wastes too much time between the charge and discharge cycles, since some time must be used for sampling and allowing for switching transients. FIG. 8 shows a generator which will produce accurately phased and synchronized signals of a higher frequency than the synchronizing signal. The synchronizing signal 350 is squared by 351, and converted into a triangular wave by the integrator 352. The symmetrical triangular wave-form of frequency $f$ is full-wave rectified by 353 by using rectifiers in the amplifier feed back paths of high gain amplifiers in the well-known manner and is applied to a buffer amplifier 354. The output of this is also a triangular wave-form only now of frequency $2f$. A second stage of full-wave rectification 355 and produces a triangular wave-form signal of $4f$, and this process may be continued until as high a frequency as is desired is obtained. The final triangular wave, in the case shown of $4f$, is taken from a buffer amplifier 356 and differentiated to produce a square-wave, and then used to drive a series of divide by two stages 359 to 363. Another divide by two element 370 is connected via switch 371 to any one of the output 364 to 368 of the dividers, so that for every impulse 371 receives, the output 372 or 370 changes over. Also when an impulse arrives at 371 all the elements 359 to 363 are reset to zero on the next clock impulse from 358, via the reset line 369. The wave-forms generated are also shown in FIG. 9. 374 is the original sine-wave which is to be synchronized with. 375 is 374 after squaring, and 376 is 375 after integrating. 377 is 376 after full wave rectification and removal of the D.C. component, and 378 is 377 full wave rectified. 379 is the square wave obtained by differentiating 378, and is four times the original frequency. 380 is the output wave-form at 371 when 371 is connected to 365, 381 is the wave-form at one terminal of 372, its inverse appearing at the other terminal of 377. These signals are applied to and gates 374, 375 where they are combined with signal 380 used to generate wave-forms 382 and 383 which operate 303 or 304 in FIG. 7 to change over the charging condensers 317 and 318 in alternate integrating periods. The wave-form 380 consists of the integrating period P which may be adjusted in duration (so that the condensers 317 or 318) have a longer or shorter period of time for charging. The intervening period $s$ is constant regardless of the length of P, and is chosen to be of sufficient time for the condensers to be sampled, and the switching transients to die down. Note that P is a multiple of $1f$ and that this is not affected by S, and therefore the repetition frequency of 380 is $$\frac{1}{P+S}$$

which is not synchronized with $f$. This is not important but the length of P is important.

In the above bridge, the nature of the response of the servo loop does not depend on the magnitude of the error signal: if the error signal is above the threshold level, the servo loop repetitively adjust the standard arms of the bridge by a single increment or decrement. Accordingly, a large number of adjustments may have to be made where the error is large, and the time taken may be inconveniently long.

This problem is aggravated when the permissible currents and voltages used in the bridge network are limited, as is the case for instance when the bridge is used for resistance thermometry at very low temperatures. For instance with germanium resistance thermometer elements operating in the temperature range 0.01 to 4° K., the permissible power dissipation in the resistance elements may be limited to $10^{-8}$ to $10^{-14}$ watts. Typically such resistance elements would have a resistance of about 25 ohms, and hence the bridge network might have to detect an error signal of the order of $5 \times 10^{-9}$ volts. The effective bandwidth of the servo loop must be limited, in order to increase the signal to noise ratio and this increases the time taken to sample the signal.

In an alternative, the nature of the response of the servo loop to an error signal greater than the threshold level is dependent on the magnitude of the error signal. The error signal is amplified and repetitively sampled, and the analogue signal sampled is converted into a digital form. This digital signal is then used to modify the switching system for the standard arms of the bridge network to an extent which is a function of the magnitude of the error signal. In this way, the number of steps necessary to rebalance the bridge can be greatly reduced.

In this embodiment, the threshold amplifier and logic network are replaced by an analogue to digital converter, such as a digital voltmeter. The resulting digital signal is added to the count held in the counter so that each response of the servo loop is a function of the magnitude of the error signal for each sampling of the error signal. The error signal is still integrated repetitively, since the balance condition is not achieved precisely in a single step.

Moreover, in this preferred embodiment of the invention, the integration period for the error signal is made variable. The initial balancing steps are made with a relatively short integration period, so that these steps are accomplished relatively quickly, and subsequent steps are made with a relatively long integration period, so as to reduce the effective band width of the servo loop. The modification of the integration period may be either predetermined so that the most significant digits are balanced with rapid steps, and the least with slow steps, or may be made a function of the magnitude of the error signal. In the latter case, the output of the integrator may be sampled at intervals equal to an integral number of cycles of the main supply, to see if the magnitude of the error signal warrants a reduced integration period.

The analogue to digital converter need not have a resolution comparable with the resolution of the bridge as a whole. For instance, the bridge may have a resolution of one part in $10^{-7}$, but the analogue to digital converter need have a resolution only of one part of $10^{-3}$. The first three most significant decades of the servo counter are then adjusted at high speed, then the middle three decades are adjusted and then the three least significant decades may be adjusted at relatively low speed, each adjustment having one decade in common with the previous adjustment. Again, this method may be predetermined or may be made dependent on the magnitude of the error signal; in the latter case, the decades on which the initial adjustment is made may be determined by the magnitude of the error signal.

The bridge is conveniently used to measure the ratio between two impedances; for instance in resistance thermometry the ratio of the resistance of an element at the unknown temperature to a stand element, or with a displacement or other transducer employing a differential capacitor or inductor, the ratio of the capacitances or inductances of the two halves. Frequently the variable being measured is not a simple function of the turns ratio of the standard inductive potential divider in the bridge, and in this preferred embodiment of the invention, the output of the counters indicating the turns ratio is passed to a digital processor incorporating an arithmetic unit and a small memory.

The exact form of the processor will depend on the use to which the bridge is to be put. For instance, if the bridge is to be used for resistance thermometry, then the processor may be used to make the following calculations: the variable resistance in terms of the standard resistance and the turns ratio; the temperature from the measured resistance (logarithmic for semiconductor thermometers), the characteristics being non-linear and often different for different thermometers which may be used with the bridge; and correction for residual errors, for instance lead resistance.

Where the bridge is to be used with a displacement transducer comprising a capacitive or inductive potential divider, the processor may make corrections for various residual errors, for instance by making linear inter-polations between a number of calibration points; may give a capability for zero offset and changes of slope in the movement characteristics; and can also be designed to store a number of readings and calculate the average.

Where the bridge is used to measure the output of strain gauges, the processor may make corrections for variations and non-linearities in the strain gauge characteristics, and calculate the strain as a function of the resistance measured.

Where such a processor is provided, it will be appreciated that it can readily perform the operations necessary to control the reed-relays in dependence on the output of the digital voltmeter.

The output data of the bridge is presented in a digital form. With the use of the processor, the exact form of the output data can be modified to suit the peripheral equipment used. For instance, where the output is to be fed to a recording device, the parallel output signal normally obtained can be converted to a serial signal.

I claim:

1. In an automatically rebalanced electrical bridge apparatus energized by a source of alternating current voltage of a given frequency and including detector means for producing an error signal representative of a degree of unbalance of the bridge, said error signal including an undesired noise component, adjusting means for controlling the state of balance of said bridge, and signal processing means for applying said error signal to said adjusting means to rebalance the bridge; the improvement wherein (1) said adjusting means comprises inductive voltage divider means operable, in response to applied control signals, in equal steps for altering the state of adjustment of said bridge circuit;

(2) and further wherein said signal processing means comprises (a) switching signal generator means for establishing a plurality of switching signals the period and timing of which are related to said alternating current voltage;

(b) sampling means operable by certain of said switching signals for sampling said error signal over a plurality of spaced sampling periods, each said period having a duration less than, and all said periods being similarly phased with respect to, a respective half-cycle of said alternating current voltage, thereby to produce a sampled error signal;

(c) integrator means cyclically operable by said sampled error signal and by another of said switching signals to produce a control signal related to said bridge unbalance as denoted by the time integral of said sampled error signal over said sampling periods, the signal-to-noise ratio in said control signal being increased as compared with the signal-to-noise ratio in said error signal, said integrator means having an initial condition yielding a zero output signal, and further including cancelling means operable by said integrating signal generator means at the end of the time interval for returning said integrator means to said initial condition; and (d) means applying said control signal to control the adjustment of said adjusting means thereby to produce a state of balance in said bridge.

2. Apparatus as defined in claim 1, wherein said error signal producing means is further operable to produce a second error signal the amplitude of which is a function of the quadrature component of the bridge unbalance error signal; and further including additional adjusting means operable by said second error signal for controlling the quadrature balance of said bridge apparatus.

3. Apparatus as defined in claim 1, wherein said signal processing means comprises first and second signal integrator means each having an initial condition producing a zero output signal and being operable to produce an integrated output signal;

switch means operable by one of said switching signals for applying said in-phase samples of said error signal to said first integrator means and for applying said quadrature samples of said error signal to said second integrator means to develop first and second integrated error signals;

amplifier means connected with said first and second integrator means for providing a fluctuating output signal containing first and second components representing said first and second integrated signals; and further switching means controlled by further ones of said switching signals for applying said first component of said output signal to said integrating means and for applying the second component of said output signal to said further adjusting means.

4. Apparatus as defined in claim 1, wherein said adjusting means includes counter means having a plurality of serially connected counter stages.

5. Apparatus as defined in claim 4, and further including further switch means responsive to the magnitude of said error signal for connecting said error signal to produce operation of a selected one of said counter stages.

6. Apparatus as defined in claim 1, wherein said adjusting means is selectively operable in opposite directions to alter correspondingly the state of balance of bridge sense, respectively; and further including detector means for producing selectively an error signal of first and second phases in accordance with the operation of said adjusting means in first and second directions, respectively, to produce a state of bridge balance; and phase-responsive switch means for applying said error signal of said first phase to produce operation of said adjusting means in said first direction, and for applying said error signal of said second phase to produce operation of said adjusting means in said second direction.

7. Apparatus as defined in claim 6, wherein said adjusting means includes digital register means operable to record a digital number; and further wherein said phase-responsive switch means applies said error signal of said first phase to increase the digital number recorded in said register and applies said error signal of said second phase to reduce the digital number recorded in said register.

8. Apparatus as defined in claim 2, wherein said further adjusting means comprises servo-controlled means for injecting a variable signal of said given periodicity into one arm of said bridge circuit.

9. Apparatus as defined in claim 1, wherein said integrator means includes capacitor means fed with said sampled error signal, and wherein said cancelling means includes discharge switch means periodically operable in response to said timing means to discharge said capacitor means.

References Cited

UNITED STATES PATENTS

| 3,064,193 | 11/1962 | Grubb et al. | 324—120 |
| 3,165,694 | 1/1965 | Young | 324—111 |
| 3,316,547 | 4/1967 | Ammann | 324—99 XR |
| 3,368,149 | 2/1968 | Wasserman | 324—99 |
| 3,445,763 | 5/1969 | Harris | 324—99 XR |

OTHER REFERENCES

Kay, B. G.; Selecting the Right Digital Voltmeter, Electronics, Apr. 4, 1966; pp. 84 to 90.

RUDOLPH V. ROLINEC, Primary Examiner

E. F. KARLSEN, Assistant Examiner

U.S. Cl. X.R.

324—99; 328—165

UNITED STATES PATENT OFFICE
CERTIFICATE OF CORRECTION

Patent No. 3,532,972                    Dated October 6, 1970

Inventor(s) Peter C. F. Wolfendale

It is certified that error appears in the above-identified patent and that said Letters Patent are hereby corrected as shown below:

Column 1, line 6, after "Claims priority, application " insert the following:

-- Great Britain, August 18, 1966, 37057/66, and --

Signed and sealed this 4th day of May 1971.

(SEAL)
Attest:

EDWARD M. FLETCHER, JR.                 WILLIAM E. SCHUYLER, JR.
Attesting Officer                       Commissioner of Patents